Patented Oct. 27, 1953

2,657,165

UNITED STATES PATENT OFFICE 2,657,165

CHLORINATED DICYCLOHEXADIENE AND INSECTICIDAL COMPOSITIONS CONTAINING THE SAME

George Allen Buntin, Wilmington, Del., assignor to Hercules Powder Company, Wilmington, Del., a corporation of Delaware No Drawing. Application September 30, 1950, Serial No. 187,821

10 Claims. (Cl. 167—30)

1

This invention relates to new polychloro tetrahydrodicyclohexadienes and more particularly to chlorinated dicyclohexadienes containing at least five chlorine atoms and to insecticidal compositions containing these chlorinated dicyclohexadienes as the toxic ingredient.

It accordance with this invention it has been found that polychloro tetrahydrodicyclohexadienes containing from five to twelve chlorine atoms may be prepared by chlorinating dicyclohexadiene and that insecticidal compositions containing these polychloro tetrahydrodicyclohexadienes having from five to twelve chlorine atoms possess an unusual degree of insecticidal activity.

The following example will illustrate the preparation of these polychloro tetrahydrodicyclohexadienes and the insecticidal activity of compositions containing them. All parts are parts by weight.

Example

Dicyclohexadiene was obtained by destructively distilling polymerized cyclohexadiene. The product obtained had a boiling point of 103°–107° C. at 13–14 mm. pressure and a refractive index at 20° C. of 1.5221. The above dicyclohexadiene, 16.4 parts, was dissolved in 2400 parts of carbon tetrachloride. Chlorine was then passed into the agitated solution in the presence of ultraviolet light at 50°–80° C. at a rate of about 25 parts by weight per hour. This permitted substantially 100% efficiency during the stage of addition chlorination and 70–90% efficiency thereafter. Two samples were taken, one at the end of 1½ hours of chlorination and the other at the end of 2 hours of chlorination. The carbon tetrachloride was removed from each of these samples by distillation under reduced pressure using a nitrogen sparge. A viscous yellow liquid remained in each case. The first of these samples contained 64.3% chlorine which corresponds to an average of 8 chlorine atoms per molecule, and the second contained 73.9% chlorine which corresponds to an average of 12 chlorine atoms per molecule. The polychloro tetrahydrodicyclohexadienes were tested for their insecticidal activity against houseflies by the bell jar method.

In the bell jar method of testing for insecticidal activity, approximately 100 five-day old flies (*Musca domestica*) are placed in a bell jar and a predetermined quantity of the insecticide to be tested is atomized into the bell jar. The quantity of insecticide used is equal to the amount of the official test insecticide which is necessary to give a 30–55% kill and must be within the limits of 0.4 to 0.6 ml. After spraying the insecticide into the chamber, the flies are placed in an observation cage containing a wad of cotton wet with a dilute sugar solution. At the end of 24 hours, the number of dead and moribund flies is counted. All tests are carried out at 80°–90° F. and 50–70% relative humidity.

The results of tests made on 5% and 2½% solutions in deodorized kerosene of the above two polychloro tetrahydrodicyclohexadienes are given in the following table. The data are an average of a series of tests made on each solution.

| Percent Chlorine | 5% Solution | | 2½% Solution | |
|---|---|---|---|---|
| | Percent Dead in 24 Hrs. | O.T.I. Difference | Percent Dead in 24 Hrs. | O.T.I. Difference |
| 64.3 | 100 | +50 | 95 | +55 |
| 73.9 | 100 | +50 | 83 | +43 |

The polychloro tetrahydrodicyclohexadienes are prepared by chlorinating dicyclohexadiene or the hydrogen chloride addition product of dicyclohexadiene. The chlorination is carried out at a temperature at which chlorination will take place and below the decomposition temperature in the presence or absence of a suitable solvent and the process is not critical. Chlorination will take place slowly above about 0° C. and darkening of the product is noticeable around 225° C. The chlorination, however, is generally carried out at a temperature in the range of 50–150° C.

The polychloro tetrahydrodicyclohexadienes useful as insecticides in accordance with this invention contain an amount of chlorine of from about 53% to about 74% and preferably from about 65% to about 74%. This corresponds to an average of about five to twelve chlorine atoms per molecule or preferably of about eight to twelve chlorine atoms per molecule. These new polychloro tetrahydrodicyclohexadienes containing from about five to about twelve chlorine atoms per molecule are viscous yellow liquids.

The new polychloro tetrahydrodicyclohexadienes of this invention are useful in insecticidal compositions. It has been found that polychloro tetrahydrodicyclohexadienes having a chlorine content of five to twelve chlorine atoms or about 53% to about 74% chlorine and preferably from about 65% to about 74% chlorine have a high insecticidal activity. Chlorinated dicyclohexadienes having a chlorine content of less than 53% are so inactive as to be worthless as insecticides. The polychloro tetrahydrodicyclohexadienes, either single compounds or as mixtures of polychloro tetrahydrodicyclohexadienes having from five to twelve chlorine atoms per molecule, are all highly effective toxicants for insecticides.

The chlorination of dicyclohexadiene involves both addition chlorination and substitution chlorination. The contacting of dicyclohexadiene in the liquid phase with chlorine involves initially addition chlorination to form a tetrachlorotetrahydrodicyclohexadiene of the formula represented by I. Further chlorination involves substitution chlorination whereby hydrogen atoms on the rings are substituted by chlorine. The resulting product of such chlorination is a mixture of isomers varying slightly with the temperature of chlorination. Due to the random substitution, such a mixture will contain small amounts of all of the possible isomers. Such a product of chlorination is expressed by Formula II.

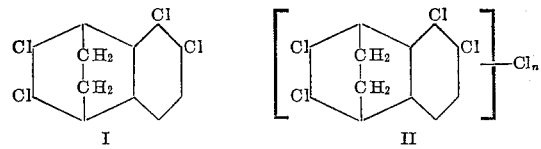

In Formula II, $n$ represents the number of chlorine atoms substituted in the rings. Thus, the products of this invention having a chlorine content of about 53% to about 74% chlorine obtained by chlorination of dicyclohexadiene will correspond to Formula II in which $n$ is an integer from 1 to 8. Similar products are obtained in the chlorination of dichlorodihydrodicyclohexadiene.

When dicyclohexadiene is combined first with hydrogen chloride or with chlorine and hydrogen chloride to form a chlorotetrahydrodicyclohexadiene and this product is further chlorinated by substitution chlorination, a chlorination mixture is obtained which is at least partly isomers falling within the scope of Formula II. All of these isomers, wherein the chlorine content is within the range of about 53% to 74% chlorine, possess toxic properties when properly compounded with a dispersing aid.

The polychloro tetrahydrodicyclohexadienes are prepared by chlorination of the dicyclohexadiene or chlorine derivative thereof at a temperature below the decomposition point of the product. Most chlorotetrahydrodicyclohexadienes tend to decompose at their boiling point and the chlorination is, therefore, carried out below the boiling temperature of the material being chlorinated. The temperature of chlorination is generally kept below about 150° C. and is ordinarily carried out above 0° C., since at lower temperatures the rate of chlorination is impractically slow. The usual range of chlorination temperature is 50° C. to about 150° C. While initial stages of chlorination, particularly the stage of addition chlorination, may be carried out at low temperatures, the final stages of chlorination must be carried out in the range above 50° C. in order to reach a sufficiently high chlorine content to reach the desired toxicity.

The chlorination may be carried out in the presence or absence of catalysts but the reaction rate is impractically slow, especially toward the end of the chlorination, in the absence of catalysts and catalysts are, therefore, generally used for practical operation. Light is one of the most satisfactory catalysts and this is preferably actinic light. It acts by accelerating the formation of free radicals. Other catalysts may also be used by adding them to the chlorination mixture either at the beginning, during the course of, or toward the end of the chlorination process. As catalysts, one may use free radical formers such as lead alkyls and organic peroxides including peroxy acids and peroxy anhydrides. Only a catalytic amount of catalyst is needed and, if used up in the process, more will be added as required. More than a catalytic amount will not ordinarily be added at one time since better control is obtained by using only as much as is necessary for attaining the desired rate of chlorination. The preferred catalysts are the organic peroxides, particularly benzoyl peroxide or acetyl peroxide. The amount of catalyst used in the chlorination will ordinarily be within the range of about 0.001 to 5% based upon the chlorination mixture.

The chlorination is generally carried out in the liquid state. For instance, a volatile chlorinated solvent such as methylene chloride, chloroform, carbon tetrachloride, ethylene chloride, trichloroethane, tetrachloroethane, or pentachloroethane is generally used in order to maintain the liquid state and to reduce the viscosity sufficiently for good contact. Any well-known means of contacting the chlorine with the dicyclohexadine or chloroderivative thereof may be used. A satisfactory method involves dispersing chlorine gas in the liquid and relying on the flow of the gas for agitation. Auxiliary agitation may also be supplied. Since the reaction is ordinarily carried out at atmospheric pressure, the solvent is chosen according to its boiling point so that the refluxing solvent can provide a satisfactory means of temperature control. When a solvent is used, the amount ordinarily is kept below about 20 volumes per volume of dicyclohexadiene or chloroderivative being chlorinated and is generally within the range of 1–5 volumes. The rate at which chlorine is supplied to the reaction mixture is substantially equal to the rate at which it is consumed in the reaction.

The polychloro tetrahydrodicyclohexadine is readily purified and freed of catalysts by washing with water until sufficiently free of hydrochloric acid and then washing with mild alkali until neutral. The catalysts are ordinarily completely removed by this procedure. After purification, the solvent is removed by distillation, preferably under reduced pressure.

The products of chlorination of dicyclohexadiene or chloroderivatives thereof when chlorinated in the above-designated temperature range still have the same carbon skeleton or ring system of dicyclohexadiene or tetrahydrodicyclohexadiene.

The insecticidal compositions of this invention are produced by admixing the polychloro tetrahydrodicyclohexadiene having a chlorine content within the range of about 53% to about 74% with a suitable diluent or adjuvant which is an inert material to facilitate the mechanical distribution of the polychloro tetrahydrodicyclohexadiene toxicant. Inert materials to facilitate the mechanical distribution of the toxicant are added for the purposes outlined in Frear (Chemistry of Insecticides, Fungicides, and Herbicides by Donald E. H. Frear, second edition, 1948, page 5) to form sprays, dusts, and aerosols from the polychloro tetrahydrodicyclohexadiene. Surface-active dispersing agents are used in admixture with the polychloro tetrahydrodicyclohexadiene to promote the spreading of the toxic material so as to improve its effectiveness. They are used in both aqueous sprays and dusts. Hydrocarbon solvents such as deodorized kerosene are also used in sprays as the sole inert material to facilitate the mechanical distribution of the toxicant.

Suitable surface-active dispersing agents for use in the compositions of this invention are those disclosed in Chemistry of Insecticides, Fungicides, and Herbicides (l. c., pages 280-287) for use with known insecticides and include soaps of resin, alginic, and fatty acids and alkali metals or alkali amines or ammonia, saponins, gelatins, milk, soluble casein, flour and soluble porteins thereof, sulfite lye, lignin pitch, sulfite liquor, long-chain fatty alcohols having 12-18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, and bentonite and related hydrated aluminum silicates having the property of forming a colloidal gel. Among the other surface-active dispersing agents, which are useful in the compositions of this invention are the omega-substituted polyethylene glycols of relatively long-chain length, particularly those in which the omega substituent is aryl, alkyl, or acyl. Compositions of the polychloro tetrahydrodicyclohexadiene toxic material and surface-active dispersing agent will in some instances have more tha none surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus, the polychloro tetrahydrodicyclohexadiene mixtures admixed with these inert materials which facilitate the mechanical distribution of the polychloro tetrahydrodicyclohexadiene in accordance with this invention are those containing the above-listed surface-active dispersing agents and hydrocarbon solvent dispersing agents.

The amount of polychloro tetrahydrodicyclohexadiene in the composition with the inert material which facilitates the mechanical distribution of the toxicant will depend upon the type of inert material and the use to which it is to be put. The compositions will generally contain less than about 30% polychloro tetrahydrodicyclohexadiene. Agricultural dusts may contain 40-60% polychloro tetrahydrodicyclohexadiene as concentrates and will generally contain 10-30% polychloro tetrahydrodicyclohexadiene in the form as used. Household sprays will contain from 0.1 to 10% polychloro tetrahydrodicyclohexadiene, preferably about 2.5% in deodorized kerosene but concentrates may contain 25-90% polychloro tetrahydrodicyclohexadiene. Agricultural sprays will, likewise, contain 0.1 to 10% of the polychloro tetrahydrodicyclohexadiene. Aqueous emulsions will contain sufficient surface-active dispersing agent to maintain an emulsion of the polychloro tetrahydrodicyclohexadiene during the spraying process. Concentrates from which emulsions are made may contain 25-90% polychloro tetrahydrodicyclohexadiene along with the surface-active dispersing agent.

For many purposes it may be desirable to use the chlorinated tetrahydrodicyclohexadiene in combination with other insecticidal toxicants. Many toxicants have a very high knockdown in relatively dilute solutions, but higher concentrations must be used in order to obtain the desired degree of kill. Due to the very high degree of killing power which the chlorinated tetrahydrodicyclohexadiene possesses, this compound may be added to such toxicants, thereby enabling the use of much more dilute solutions than would otherwise be possible. Toxicants with which this chlorinated tetrahydrodicyclohexadiene may be combined include such compounds as rotenone, pyrethrum, and organic thiocyanates such as alkyl thiocyanates, thiocyanoethers such as $\beta$-butoxy-$\beta'$-thiocyanoethyl ether, and terpene thiocyanoacylates such as isobornyl thiocyanoacetate, fenchyl thiocyanoacetate, isobornyl $\alpha$-thiocyanopropionate, etc.

The insecticidal compositions of this invention are useful in combatting flies, mosquitoes, roaches, moths, carpet beetles, bedbugs, boll weevils, boll worms, army worms, grasshoppers, and many other pests.

This application is a continuation-in-part of application Serial Number 45,429, filed August 20, 1948, now abandoned.

What I claim and desire to protect by Letters Patent is:

1. The product of chlorination of dicyclohexadiene dissolved in an inert solvent with chlorine gas in the presence of a free radical-forming chlorination catalyst at a temperature in the range of 50° to 150° C. and containing from about 53% to about 74% chlorine.

2. The product of chlorination of dicyclohexadiene dissolved in an inert solvent with chlorine gas in the presence of a free radical-forming chlorination catalyst at a temperature in the range of 50° to 150° C. and containing an average of eight chlorine atoms per molecule.

3. The product of chlorination of dicyclohexadiene dissolved in an inert solvent with chlorine gas in the presence of a free radical-forming chlorination catalyst at a temperature in the range of 50° to 50° C. and containing an average of twelve chlorine atoms per molecule.

4. An insecticidal composition comprising the product of chlorination of dicyclohexadiene dissolved in an inert solvent with chlorine gas in the presence of a free radical-forming chlorination catalyst at a temperature in the range of 50° to 150° C. and containing from about 53% to about 74% chlorine, and an insecticidal adjuvant as a carrier therefor.

5. An insecticidal composition comprising the product of chlorination of dicyclohexadiene dissolved in an inert solvent with chlorine gas in the presence of a free radical-forming chlorination catalyst at a temperature within the range of 50° to 150° C. and containing from about eight to about twelve chlorine atoms per molecule, and an insecticidal adjuvant as a carrier therefor.

6. An insecticidal composition comprising the product of claim 2 and an insecticidal adjuvant as a carrier therefor.

7. An insecticidal composition comprising the product of claim 3 and an insecticidal adjuvant as a carrier therefor.

8. An insecticidal composition comprising the product of chlorination of dicyclohexadiene dissolved in an inert solvent with chlorine gas in the presence of a free radical-forming chlorination catalyst at a temperature within the range of 50° to 150° C. and containing from about eight to about twelve chlorine atoms per molecule and a hydrocarbon solvent insecticidal adjuvant as a carrier therefor.

9. An insecticidal composition comprising the product of chlorination of dicyclohexadiene dissolved in an inert solvent with chlorine gas in the presence of a free radical-forming chlorination catalyst at a temperature within the range of 50° to 150° C. and containing from about eight to about twelve chlorine atoms per molecule and a solid insecticidal adjuvant as a carrier therefor.

10. An insecticidal composition comprising an aqueous insecticidal dispersion of the product of chlorination of dicyclohexadiene dissolved in an inert solvent with chlorine gas in the presence of a free radical-forming chlorination catalyst at a temperature in the range of 50° to 150° C. and containing from about eight to about twelve chlorine atoms per molecule.

GEORGE ALLEN BUNTIN.

No references cited.